Feb. 10, 1953 J. H. HOMRIGHOUS 2,628,274

MULTIPLEX TELEVISION SYSTEM

Filed Feb. 20, 1946 4 Sheets-Sheet 1

INVENTOR.

John W. Homrighous

INVENTOR.
John H. Homrighous

INVENTOR.
John H. Homrighous

Feb. 10, 1953 J. H. HOMRIGHOUS 2,628,274

MULTIPLEX TELEVISION SYSTEM

Filed Feb. 20, 1946 4 Sheets-Sheet 4

INVENTOR.

John H. Homrighous

Patented Feb. 10, 1953 2,628,274

UNITED STATES PATENT OFFICE 2,628,274

MULTIPLEX TELEVISION SYSTEM

John H. Homrighous, Oak Park, Ill.

Application February 20, 1946, Serial No. 648,993

29 Claims. (Cl. 178—5.6)

This invention relates to a communication system and more particularly to a communication system for the transmission and reception of a number of pictures, or a number of messages, or several different pictures and accompanying sound messages through a common transmission path or lane.

Accordingly one of the main objects of my invention is to provide in a communication system means for transmitting a number of different pictures in recurrent periods over a common carrier wave.

Another object of my invention is to provide picture reproducing devices for the reproduction of a number of pictures at the same time from signals received over a common carrier wave with means for reproducing any one of the pictures individually on any one of the reproducing devices.

Another object of my invention is to provide sound mechanisms for audibly reproducing simultaneously a number of different messages received over a common carrier wave with means for reproducing any one of the messages individually on any one of the mechanisms.

Another object of my invention is to provide means for transmitting over a single carrier wave a number of messages or programs with means for changing the transmission of any message to different recurrent periods.

Another object is an improved means for the simultaneous transmission and reception of pictures and sound at widely separated locations through a common transmission path.

Another object of the instant invention is to provide an improved means for scanning several cathode ray tube screens in successive rotation.

Another object is to provide an improved facsimile communication system for transmitting and recording the subject matter on relatively large sheets of paper.

Another object is the provision of means for rapidly transmitting a number of sheets or pages of subject matter from one or more stations over a common transmission path or lane and for automatically recording the same at one or more distant stations.

In this invention I employ high or ultrahigh frequency carrier waves amplitude modulated; however, it is to be understood that the principles involved may be equally applicable to microwaves and to frequency modulation.

Message in this specification is to be understood to include any intelligence represented by sound, picture or facsimile signals.

A channel in this specification is to be understood as a one way path for the transmission of electrical signals between two stations and may be one of a number of carrier wave channels in a transmission path or lane for the transmission of signals representative of a message.

Messages may be transmitted through the common transmission path in recurring periods. The preassigned periods of time for separate messages remain fixed regardless of the number of messages being intermittently transmitted.

The scanning control system described in this specification may be considered a modification of my "Self Synchronizing System" shown and described in copending applications Serial No. 451,722 filed July 21, 1942, now Patent No. 2,398,461, issued April 16, 1946, Serial No. 476,897, filed February 24, 1943, now Patent No. 2,524,349, issued October 3, 1950, and the system shown in copending application Serial No. 542,317 filed June 27, 1944, now Patent 2,524,008, issued September 5, 1950. In these systems line control pulses may initiate the horizontal retrace of the electron ray from any location it has reached on its associated screen, and the field control pulses may initiate both the horizontal and vertical retrace of the electron ray from any location reached on the associated screen. The modification of the scanning control system comprises means for scanning like lines on two or more cathode ray tube screens in successive rotation for the transmission and reception of video signals representative of two or more messages. Sound signals may be included whereby video and sound signals may be alternately transmitted and received over a common carrier.

In my prior application Serial No. 542,317 I have shown a system for the transmission and reception of picture signals and sound signals through a common carrier wave. In the instant invention signals representative of a plurality of pictures with related sound signals may be transmitted on the same carrier wave.

The system or method of communication herein described may be considered as an improvement over my copending application Serial No. 472,105 filed January 12, 1943, now Patent No. 2,437,027, issued March 2, 1948. In this prior application I have described a communication system for the transmission and reception of a number of intelligence messages over a common transmission path by transmitting in successive rotation fragmentary portions of each message. In the instant case I include further means for transmitting video signals for a number of different scenes or pictures in successive rotation over a common transmission path with means for individually reproducing the picture images from any scene together with related sound.

Other objects and advantages will appear from the following description taken in connection with the accompanying drawings in which:

Figure 1 shows a block diagram for a transmitter, and receiver stations, each having a number of channels for individual picture and sound communication over a common carrier wave or path. Each channel equipment through switching means may transmit or receive message signals over any channel at its associated station.

Figures 1, 2:
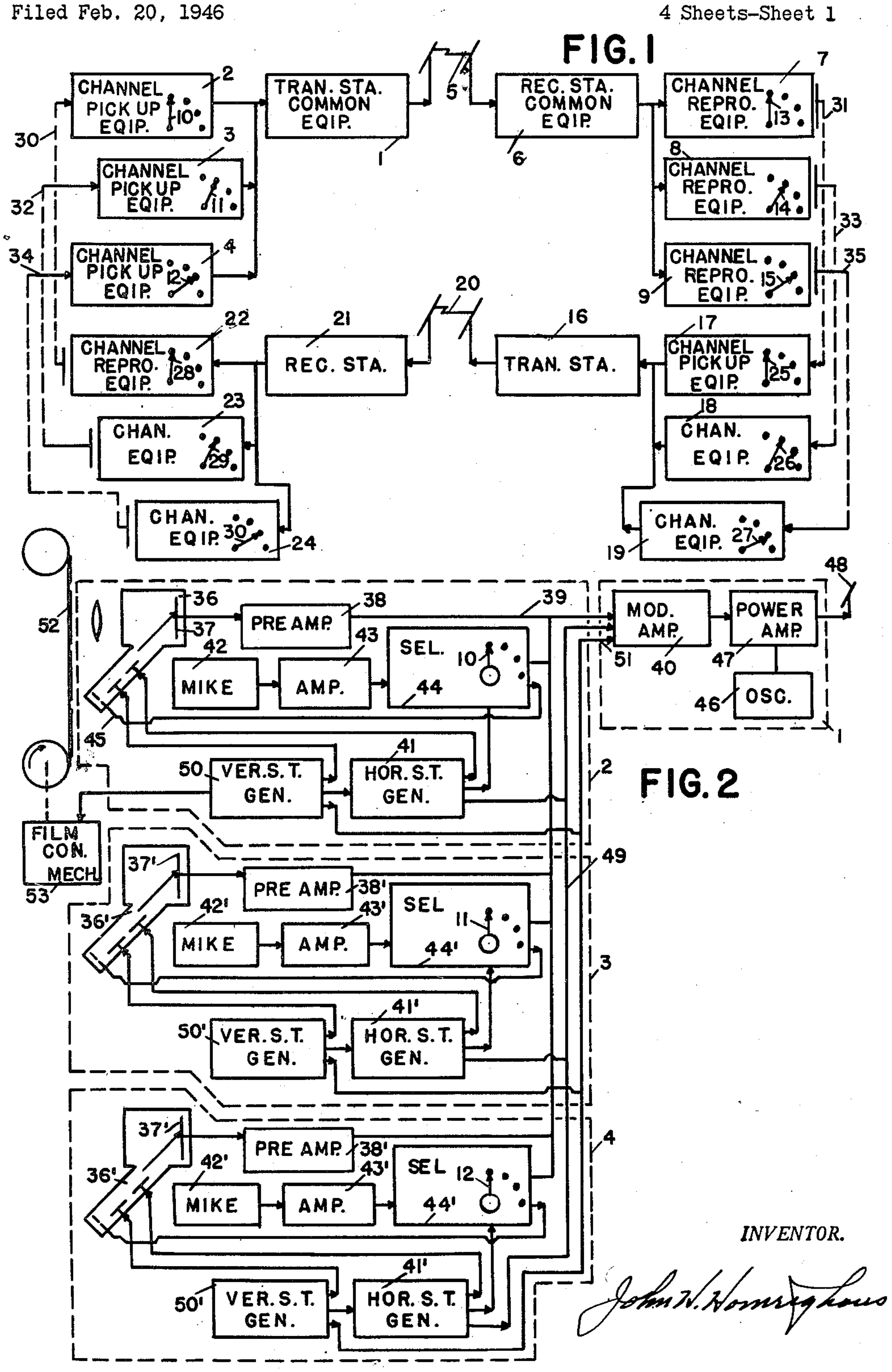
Figure 1 is a simplified diagrammatic view of a plurality of message channels terminating in common transmitter and common receiver stations for the transmission and reception of video signals and sound signals representative of a number of messages through a common transmission path.
Figures 2 and 3 show in more detail transmitting and receiving stations, respectively, used in Figure 1.

Figure 2 shows a block diagram for either one of the transmitting stations used in Figure 1 whereby a plurality of pictures or facsimile messages with related sound may be transmitted in rotation over a common carrier wave or transmission path. While only three channels are shown it is to be understood that other channels may be employed to transmit other messages. Typewritten or other symbols as indicated for one channel only may be transmitted over any one or all of the channels.

Figure 3:
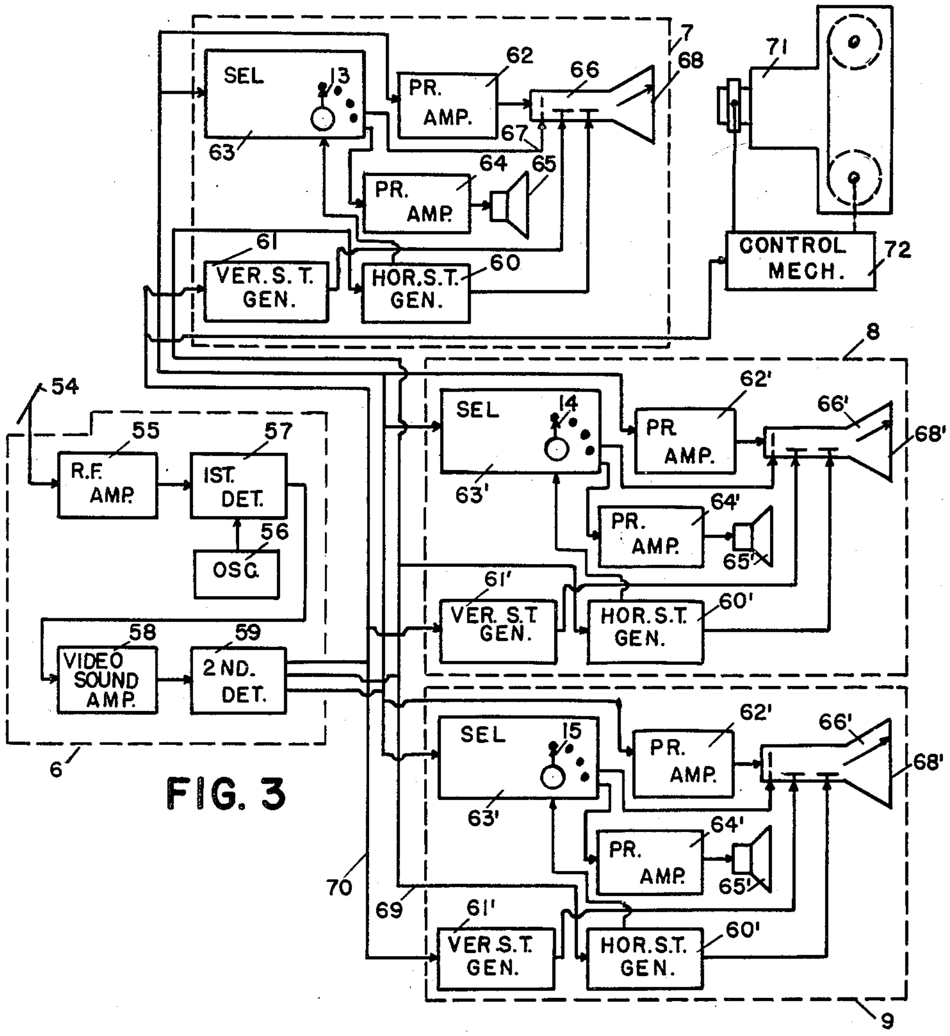

Figure 3 shows a block diagram for either one of the receiving stations used in Figure 1, comprising a number of separate channels for the reception of a plurality of separate messages or through switching means any program or message being intercepted by the receiving station may be reproduced over any one or all of the channels as desired. Photographic recording equipment is shown for only one channel, but it is to be understood that all the channels may be so equipped.

Figure 4:
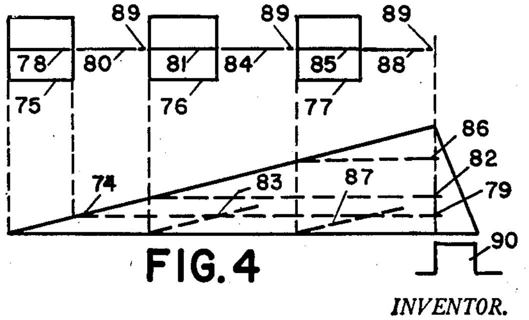
Figure 4 is a graphical view illustrating the time periods in a saw tooth wave for the various messages including control signals.

Figure 4 illustrates graphically the periods of time that may be allotted to each of the several messages, and the control trigger pulse during the interval of one horizontal saw tooth wave.

Figure 5:
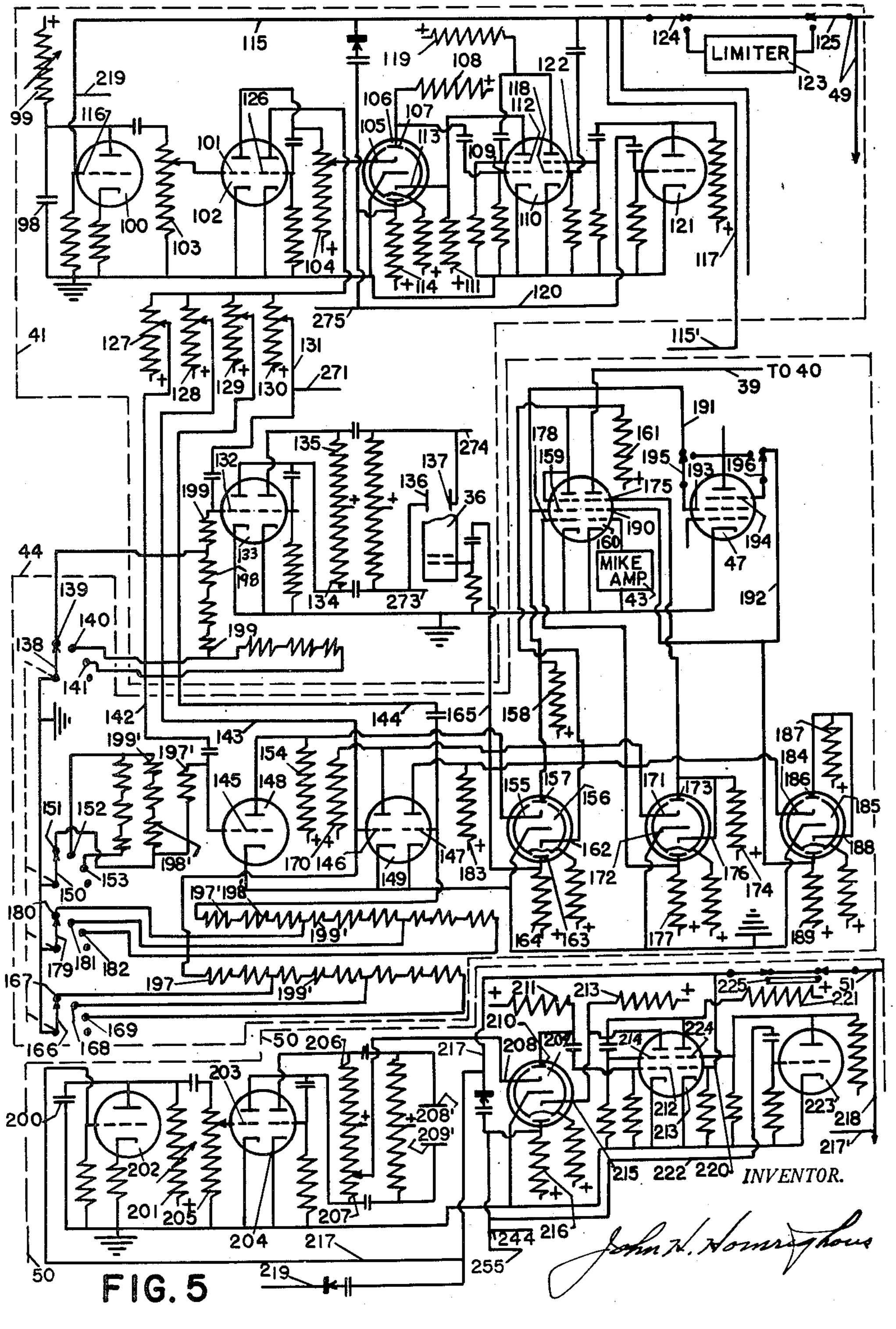
Figure 5 is a circuit diagram showing a channel path selector and vertical and horizontal saw tooth generators to produce saw tooth waves for controlling electron ray deflection and to control the intermittent transmission of a number of messages through the channel path selector.

Figure 5 shows apparatus and associated circuits to produce saw tooth waves for controlling the scanning actions of the several cathode ray tubes at the transmitter or receiver stations, and also to control the selection of a number of periods in each saw tooth wave for the transmission or reception of individual messages.

Figure 6:
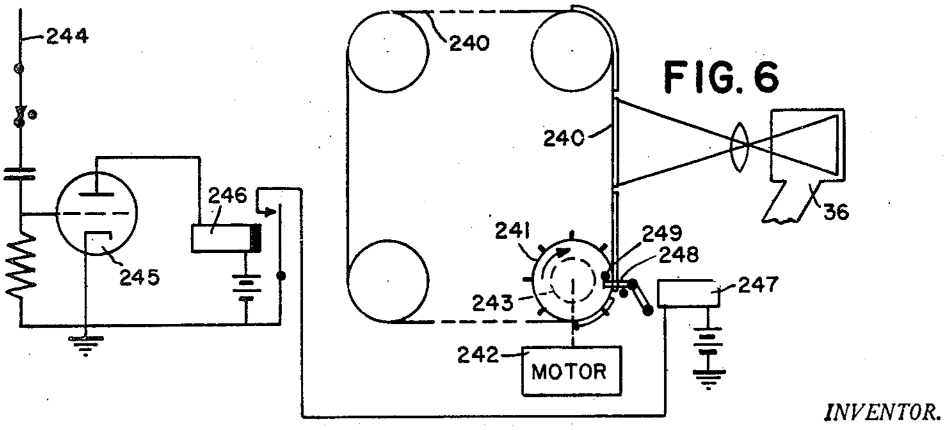
Figure 6 shows motor driven mechanism for moving sheets or pages of subject matter within the view of the pick up tube.

Figure 6 shows mechanism for the transmitting station driven by a continuously rotating motor through a slip clutch for rapidly and intermittently moving relatively large sheets or pages of paper having subject matter thereon within the view of a cathode ray pick up tube to produce video signals representative of the subject matter for transmission to one or more distant stations.

Figure 7:
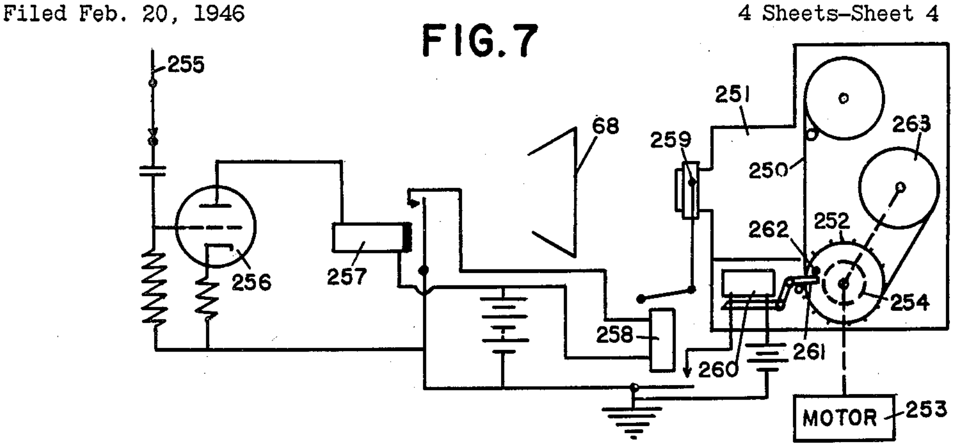
Figure 7 shows mechanism for actuating a camera shutter and motor driven mechanism for moving a film in camera.

Figure 7 shows mechanism for the receiving station driven by a continuously rotating motor through a slip clutch for rapidly and intermittently moving a film adjacent the cathode ray viewing tube screen to automatically record facsimile images on the film from the tube screen.

Figure 8:
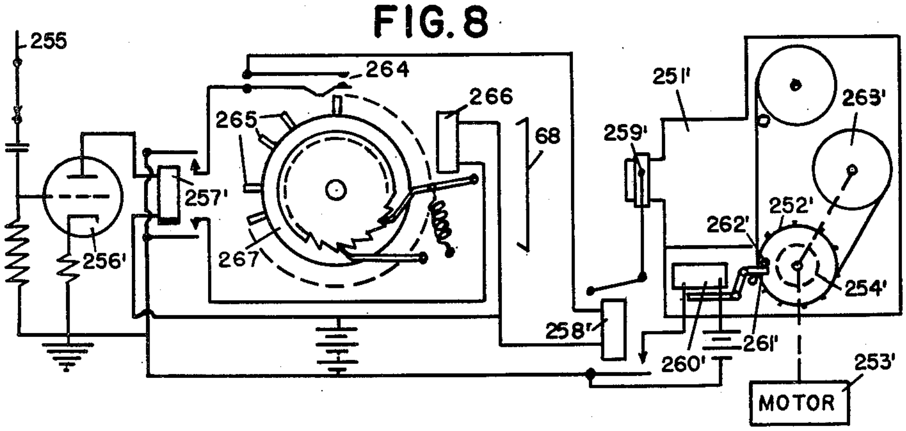
Figure 8 shows mechanism for actuating a camera shutter and film reel for automatically photographing picture images appearing on a cathode ray tube screen.

Figure 8 shows mechanism that may be used at the picture receiving station for actuating the shutter and film reel in a camera adjacent to a cathode ray picture tube to automatically record or photograph the picture images on the cathode ray tube screen at the termination of each two fields and each three fields in sequence. With this arrangement twenty-four picture frames may be produced on this picture film for each thirty picture frames appearing on the picture tube screen.

With further reference to Figure 1 the numeral 1 designates a radio transmitting station or the equipment common to a transmission path for transmitting signals from a number of pick up or channel equipments 2, 3 and 4 in rotation through the transmission path or lane indicated at 5, to a radio receiving station 6, where the several messages may be reproduced in the channel or reproducing equipments 7, 8 and 9. The channel equipments 2, 3 and 4 may be in different locations and each equipment may through its associated switch 10, 11 or 12 select any one of a number of different recurring periods of time or channel paths for the transmission of messages comprising video signals and other signals representative of sound. Similarly, each receiver channel equipments 7, 8 or 9 may through their associated switches 13, 14 or 15 select any one of a number of channel paths or predetermined periods for the reception of message signals from the receiver 6.

To transmit signals in the opposite direction I provide another radio transmitting station 16 for transmitting message signals from the pick up or channel equipments 17, 18 and 19 through a transmission path as indicated at 20, to a radio receiving station 21, where the several messages may be reproduced in the reproducing or channel equipments 22, 23 and 24. Each transmitter channel equipment may through one of the selector switches 25, 26 or 27 be associated with any one of a number of channel paths to the transmitter 16. Likewise each of the receiver channel equipments may through one of the selector switches 28, 29 or 30 be associated with any one of a number of channel paths from the receiver station 21. Therefore, any transmitter channel equipment may be associated with any receiver channel equipment for the transmission of message signals therebetween.

Pairs of channel equipment at both terminals of the transmission path may be utilized for two-way conversation as indicated by the lines 30 and 31, 32 and 33, and 34 and 35. Different arrangement of pairs of channel equipment may through different positions of the selector switches be used for two-way messages.

Again referring to Figure 2 showing the transmitter 1 and associated channel equipments 2, 3 and 4 of Figure 1 in greater detail, which may also be the transmitter 16 and associated channel equipments 17, 18 and 19. As illustrated, the channel equipment 2 may comprise a cathode ray tube 36 of conventional type, having a mosaic 37, a photoelectric screen on which a light image of the object being televised is projected and an electron gun for generating a ray of electrons directed toward the screen and two sets of deflecting plates for deflecting the electron ray at the line and field frequencies, so that it is caused to scan the screen. The picture or video signals are thereby developed and fed to the preamplifier 38; from the amplifier 38 the signals may be supplied over connection 39 to the modulation amplifier 40 only during the line trace periods in tube 36, which may be a first one of a number of recurrent periods in the saw tooth waves produced in the saw tooth generator 41 corresponding to one channel path. Signals from the microphone 42 for sound related to the pictures are fed through the amplifier 43 to the selector 44, from the selector 44 the sound signals may be fed in a second one of a number of recurrent periods over conductor 39 to the modulation amplifier 40 under the control of the generator 41. Through the operation of the switch 10 the channel equipment 2 may be arranged to transmit signals from the amplifier 43 over other channel paths, likewise the operation of switches 11 and 12 may associate the channel equipments 3 and 4 with any one of a number of channel paths to be more fully explained later. Also through the operation of the switch 10 the channel equipment 2 may interrupt or block the electron ray in tube 36 in different periods by lowering the potential of the control grid over the connection 45.

A carrier wave is provided by the oscillator 46. In the power amplifier 47 this carrier wave may be modulated by video signals and sound signals from the pick up tube 36 and the microphone 42 in first and second recurrent periods or first and second channel paths. Video and sound signals from the channel equipments 3 and 4 may modulate the carrier wave in other recurrent periods or over other channel paths which may be applied to the antenna 48.

The horizontal saw tooth wave generator 41 may produce a series of successive saw tooth waves with control signals for terminating the waves. These saw tooth waves may be utilized in the selector 44 for selecting any one of the several channel paths to the transmitter 1. The saw tooth waves produced in 41 may deflect the electron ray in tube 36 horizontally during spaced periods of time to be more fully explained later. The control signals produced in 41 may trigger the generator 41 and like generators in channel equipments 3 and 4. These signals may also be modulated on the carrier wave over connection 49 during retrace periods for controlling or synchronizing the saw tooth wave generators at the receiving station.

The vertical saw tooth wave generator 50 may produce a series of saw tooth waves with control signals to terminate the waves. These waves may deflect the electron ray in tube 36 vertically to cause the electron ray to scan a number of lines in each successive frame. The control signals produced in generator 50 may trigger the generator 50 and like vertical saw tooth generators in channel equipments 3 and 4. These signals may be applied to the horizontal saw tooth generator 41 to deflect the electron ray backward horizontally at the end of each frame. The vertical control signals may also be modulated on the carrier wave over connection 51 during vertical retrace periods for controlling or synchronizing the vertical saw tooth wave generators at the receiving stations.

The channel equipments 3 and 4 may be similar to that described for channel equipment 2 with like reference numerals primed indicating similar parts so that further description is thought to be unnecessary.

Within the view of tube 36 I have shown a movable member 52 which may be a conventional moving picture film or a belt with sheets of typewritten matter or coded characters secured thereto. The member 52 may be moved in front of tube 36 by the mechanism 53 under the control of vertical control signals from generator 50. This mechanism may be similar to the film control mechanism shown and described in my copending application Serial No. 476,897 filed February 24, 1943, whereby picture signals representative of the subject matter may be transmitted in spaced periods through a common transmission path. It is to be understood that apparatus similar to 52 and 53 may be utilized at both tubes 36′ for transmitting signals representative of other subject matter over the common carrier wave or different scenes within the view of the several pick up tubes may be televised.

With further reference to Figure 3 showing the receiver 6 and associated channel equipments 7, 8 and 9 of Figure 1 in greater detail, which may be like the receiver 21 and associated channel equipments 22, 23 and 24. As illustrated the antenna 54 receives the carrier wave signals from the transmitter antenna 48 to a radio frequency amplifier 55. An oscillator 56 reacts with these signals in the first detector stage 57 on the heterodyne principle to produce an intermediate frequency which is supplied to the video and sound intermediate amplifier stage 58. After suitable amplification the video signals, sound signals and control signals are demodulated at 59. The control signals being of greater amplitude are separated and fed to the horizontal and vertical saw tooth wave generators and associated circuits 60 and 61 to control or terminate the saw tooth waves. These control signals may also be supplied to like saw tooth wave generators in the channel equipments 8 and 9 to control or terminate the saw tooth waves produced in these channel equipments.

The video signals and sound signals are fed from the second detector 59 to the power amplifier 62 and selector 63. The selector 63 under the control of the saw tooth waves produced in generator 60 allots suitable periods of time for the sound signals which may be supplied to the power amplifier 64. From the amplifier 64 they are fed to the loud speaker 65. The selector 63 also controls or interrupts the electron ray in tube 66 by lowering the potential on its control grid over the connection 67 during certain periods as determined by the switch 13.

The video signals are fed from the amplifier 62 to the viewing tube 66. The viewing tube 66 is represented as being in the form of a cathode ray tube of a conventional type and comprises a fluorescence screen 68, an electron gun for developing a ray of electrons directed toward the screen, and two sets of electrostatic plates for deflecting the electron ray at the line and field frequencies to cause it to scan the screen. The video signals are applied to the control electrode of the electron gun, whereby the intensity of the electron ray is made to vary with the video signals. Through the operation of switch 13 the channel equipment 7 may be arranged for the reception of message signals during different recurrent periods or over any one of a number of channel paths. Likewise the switches 14 and 15 may be operated to associate the channel equipments 8 and 9 with any one of a number of channel paths to be explained more fully later.

The horizontal saw tooth wave generator 60 may be like the generator 41, Figure 2, and may produce a series of saw tooth waves under the control of received control signals. These saw tooth waves may be utilized in the selector 63 for selecting any one of a number of channel paths from the receiver 6 for the reception of message signals. The saw tooth waves produced in generator 60 may deflect the electron ray in tube 66 horizontally. The vertical saw tooth generator 61 may be like the generator 50, Figure 2, and may produce a series of saw tooth waves under the control of received control signals to deflect the electron ray in tube 66 vertically to cause the electron ray to scan the tube screen 68 for producing facsimile images thereon.

The received control signals may trigger or control the saw tooth generators in the channel equipments 8 and 9 over the connections 69 and 70.

The channel equipments 8 and 9 may be similar to the equipment 7 with like reference numerals primed indicating similar parts so that further description is thought to be unnecessary.

From the above description it is to be understood that two or more television broadcast programs including related sound may be transmitted through a common transmission path for simultaneous reception and that each receiving channel equipment may be arranged for the reception of any one of the broadcast programs.

For recording the pictures or other subject matter I provide a moving picture camera 71 in front of the screen 68. The shutter and film reel may be actuated by the mechanism 72 under the control of received vertical control signals. This mechanism may be similar to the recording control mechanism shown and described in my copending application Serial No. 638,038 filed December 29, 1945, whereby facsimile images of transmitted subject matter may be recorded on a moving film. It is to be understood that apparatus similar to 71 and 72 may be utilized at both tube screens 68′ for recording different messages received over a common transmission path.

With reference to Figure 4 which diagrammatically illustrates a saw tooth voltage wave at 74 with different amplitude measurements indicating the periods for picture and sound signal transmission or reception. Each saw tooth wave 74 in a series of successive waves may cause the deflection of the electron rays in two or more cathode ray tubes in succession, one horizontal line being indicated in each of the three picture frames 75, 76 and 77. A line similar to 78 being initiated in frame 75 at the start of each saw tooth wave 74 and terminated at the end of the first period or at the leaving edge of the frame 75 as determined by an amplitude measurement at 79 in the saw tooth waves. The line 80 indicates the period of time for sound signals related to the pictures in frame 75 also determined by an amplitude measurement in the saw tooth waves.

The line 81 on a second cathode ray tube screen may be initiated at the beginning of a third message period in each successive saw tooth wave as determined by an amplitude measurement at 82 in the saw tooth wave. During the third message period in the saw tooth waves the electron ray in the second tube may be deflected across its associated screen by changes in potential supplied to its associated deflecting plates at the beginning of the third period as indicated by the dash line 83. The line 84 indicates the period of time for sound signals related to the pictures in frame 76. The line 85 on a third cathode ray tube screen may be initiated at the beginning of a fifth message period in each successive saw tooth wave as determined by an amplitude measurement at 86 in the saw tooth waves. During the fifth message period in each saw tooth wave the electron ray in a third tube may be deflected across its associated screen by changes in potential on its associated deflecting plates as indicated by the dash line 87. The line 88 may indicate a sixth message period of time allotted for sound signals related to the pictures in frame 77. The relatively short lines 89 may represent delay periods between different sets of related signals. The numeral 90 may indicate the horizontal trigger signal or control impulse. The operation of the saw tooth generator and associated circuits will be explained later.

Again referring to Figure 5 showing horizontal and vertical saw tooth wave generators together with a channel path or signal group selector which may be like the saw tooth generator and selector in the channel equipments 2, 3, 4, 6, 8 and 9. The apparatus and associated circuits 41 for producing a series of saw tooth voltage waves comprise a condenser 98 charged through a variable resistor 99 from a source of positive potential as indicated. When the condenser 98 becomes charged, the saw tooth or timing wave in the plate circuit of tube 100 is impressed on the grid 101 of multi-unit tube 102 through an adjustable contact on resistor 103 for adjusting or controlling the amplitude of the saw tooth voltage wave. The voltage drop developed at load resistor 104 after a suitable interval to cover the time periods for a number of messages will change the potential on the control electrode 105 in off and on relay tube 106 to drive the electrons from the anode 107, thereby increasing the potential at load resistor 108 producing a positive pulse which may be applied to the grid 109 of the multi-unit tube 110. This positive pulse on grid 109 may produce a voltage drop at load resistor 111, provided that there is not a negative pulse received at the same time on grid 112. The voltage drop at resistor 111 may be applied to the control electrode 113 in tube 106 interrupting the current through load resistor 114 to produce a positive control impulse over conductor 115 to the grid 116 of trigger tube 100 rendering this tube conductive to discharge the condenser 98, thus lowering the saw tooth potential to substantially zero value. At the termination of the control impulse the condenser 98 will again become charged, thereby producing another saw tooth wave. The control impulse supplied to conductor 115 may be supplied over this conductor to the modulation amplifier 40, Figure 2, to modulate the carrier wave with the control impulse. The impulses may be supplied over conductor 117 to the other horizontal generators 41′ for terminating the saw tooth wave produced in these generators. The relay tube 106 and like tubes are described in above mentioned application Serial No. 472,105.

Since the horizontal saw tooth generators in channel equipments 2, 3 and 4 are similar they are preferably adjusted so that each generator will have a slightly different time interval, or the trigger tubes may become conductive in sequence in order that the generator having the shortest interval may be controlling.

Assuming that generator 41' in channel equipment 3 as having the shortest interval, that is, it is the controlling generator, then control impulses may be supplied over conductors 115', 117 and 115 to trigger tube 100 and to modulate the carrier wave. The control impulses received from generator 41' may be supplied to grid 118 in tube 110 to produce a voltage drop at load resistor 119 which is supplied to the grid 112 at substantially the same time that a positive pulse is supplied to the grid 109 as previously explained to maintain the control electrode 113 at normal potential to block the development of a control impulse at resistor 114 when control signals are received from another generator, or they may be received from the second detector when the generator is used in the receiving station.

The control signals produced at load resistor 114 when the generator 41 is controlling may be supplied over conductor 120 to the grid in tube 121 to provide a negative pulse to the grid 122 at the same time that a positive pulse developed at the load resistor 114 is supplied to the grid 118 by way of conductor 115 thereby eliminating interference with the control signals produced in the same generator.

It is to be understood that the generator 41 may supply saw tooth potentials to all of the channel equipments 2, 3 and 4 when they are suitably located.

A limiter stage 123 having relatively low anode voltage may be provided through switches 124 and 125 to maintain the horizontal control signals at a predetermined value when two or more generators produce control signals at the same time.

To deflect the electron ray in any tube shown in Figure 2 during different periods in each saw tooth wave or to transmit picture signals from any one of the tubes in different selected periods means are provided to utilize the saw tooth waves produced by charging and discharging the condenser 98. The voltage change developed at resistor 104, as previously explained may be applied to the grid 126 tube 102 thereby producing saw tooth voltages at load resistors 127 through 130. The saw tooth potentials at resistor 130 may be applied over conductor 131 to the grid 132 in tube 133. After suitable amplification in the double anode circuits of tube 133 the potential changes at load resistors 134 and 135 may be applied to the cathode ray tube deflecting plates 136 and 137 for deflecting the electron ray horizontally. The bias on the grid 132 may be adjustable through the brush 138 so that the deflection of the electron ray will be initiated at the beginning of each wave when the brush 138 is in engagement with the first contact 139; with the brush in engagement with contact 140 the deflection of the electron ray will be delayed until a certain predetermined potential is obtained on the grid 132, and further delay may be effected by rotating the brush 138 into engagement with contact 141 causing a still higher potential on the grid 132 before initiating the horizontal deflection of the electron ray. By the rotation of switch brush 138 any channel path may be selected to transmit picture signals.

The channel path selector 44 may be employed to select different recurrent periods in a series of saw tooth waves for the transmission of message signals. To initiate and terminate the transmission of video signals and sound signals in different selected recurrent periods over a common transmission path the saw tooth potentials at the load resistors 127, 128 and 129 may be applied over conductors 142, 143 and 144 to the grids 145, 146 and 147 in tubes 148 and 149. The bias on grid 145 may be adjustable through the brush 150 so that current may flow through the anode circuit of tube 148 at the beginning of each saw tooth wave with brush 150 engaging contact 151; with the brush in engagement with contact 152 current through the tube will be delayed until the start of the third period in the saw tooth waves and when the brush engages contact 153 current through the tube may be further delayed until the start of the fifth period to produce a voltage drop at load resistor 154 which may be applied to the control electrode 155 in tube 156 interrupting the current flow through the anode 157 to increase the potential at load resistor 158 which may be applied to the grid 159 in tube 160. The increased potential on grid 159 causes a voltage drop at load resistor 161 which may be applied to the control electrode 162, in tube 156 driving the electrons from the anode 163 to increase the potential at load resistor 164 which is supplied over conductor 165 to the control grid in tube 36 thus rendering the electron ray in tube 36 operative to scan its image screen.

The bias on grid 146 tube 149 may be adjustable through the brush 166 engaging contacts 167, 168 or 169 so that current may flow through the anode circuit of the left unit of tube 149 at the beginning of either the second, fourth or sixth periods respectively to produce a voltage drop at load resistor 170 which may be applied to the control electrode 171 in the off and on relay tube 172 substantially interrupting the current flow through the anode 173 and load resistor 174. The increased potential at load resistor 174 may be applied to the grid 175 in tube 160 to initiate the transmission of signaling currents through the right unit of tube 160 from the microphone preamplifier 43 at the beginning of the second, fourth or sixth periods in the saw tooth waves. The increased potential at load resistor 174 may also be applied to the control electrode 176 in tube 172 to initiate current flow through load resistor 177, thereby producing a negative potential on grid 178 in tube 160 for substantially interrupting current through the left unit of tube 160. This interruption of current in tube 160 increases the potential at load resistor 161, which may be applied to the control electrode 162 tube 156 for producing a voltage drop at load resistor 164 which is applied over conductor 165 to the control grid in tube 36 thus substantially blocking the electron ray during periods when other message signals may be transmitted or during all message periods except one in each saw tooth wave.

The bias on grid 147 tube 149 may be adjustable through the brush 179 engaging contacts 180, 181 or 182 so that current may flow through the anode circuit of the right unit of tube 149 at the termination of either the second, fourth or sixth period respectively to produce a voltage drop at load resistor 183 which may be applied to the control electrode 184 in the off and on relay tube 185 substantially interrupting the current flow through the anode 186 and load resistor 187. The increased potential at load resistor 187 may be applied to the control electrode 188 to initiate current flow through load resistor 189, thereby producing a negative potential on grid 190 in tube 160 to stop or terminate the microphone signals through the right unit of tube 160 at the end of the second, fourth or sixth period in the saw tooth waves.

The carrier wave may be suppressed by the potential changes at load resistors 158 and 189 in the anode circuits of tubes 156 and 185 which may be supplied over conductors 191 and 192 to the grids 193 and 194 in the power amplifier 47 when it is desired to transmit and receive message signals over carrier waves of the same length. The switches 195 and 196 may be actuated to connect grids 193 and 194 to the anode during one way transmission over a single transmission path.

Since the amplifiers 133, 148 and 149 may be controlled by similar potential changes the bias resistors connected to the grids 132, 145, 146 and 147 may be arranged in a similar manner, for instance ground potential on lower terminal of first bias resistors 197 or 197′ means that any increase in potential on the grid will increase the current through the tube. With ground potential on lower terminal of the second resistor 198 or 198′ the current through the tube will not change until the voltage on grid has reached a certain value or the tube will not start conducting until the beginning of the second period. The resistors 199 and 199′ are for introducing a short period between the termination of sound signals and the initiation of picture signals.

From the above it is seen that the selector switch in any channel equipment may be actuated to select any one of several channel paths for the transmission of picture and related sound or for the reception of any one of a number of picture and sound programs over a single carrier wave. While only three channel equipments have been shown at the transmitter and receiver station it is to be understood that other channel equipments may be employed for other programs.

The vertical saw tooth generator 50 for producing a series of saw tooth waves may be very similar to the horizontal saw tooth generator 41 described above. The condenser 200 may be charged through a variable resistor 201 from a source of potential as indicated; when the condenser 200 becomes charged, the saw tooth voltage wave in the plate circuit of tube 202 is impressed on the grid 203 of multi-unit tube 204 through an adjustable contact on resistor 205 for adjusting the amplitude of the saw tooth voltage wave. After suitable amplification in the double anode circuits of tube 204 the potential change at load resistors 206 and 207 may be applied to the cathode ray tube deflecting plates 208′ and 209′ for deflecting the electron ray vertically. The voltage drop developed at load resistor 207 may change the potential on the control electrode 208 in off and on relay tube 209 to drive the electrons from the anode 210, thereby increasing the potential at load resistor 211 producing a positive pulse which may be applied to the grid 212 of the multi-unit tube 213. This positive pulse on grid 212 may produce a voltage drop at the load resistor 213 provided that there is not a negative pulse received at the same time on grid 214. The voltage drop at resistor 213 may be applied to the control electrode 215 in tube 209 substantially interrupting the current through load resistor 216 to produce a positive control impulse over conductor 217 to the grid of trigger tube 202 rendering this tube conductive to discharge the condenser 200, thus lowering the saw tooth potential to substantially zero value thereby returning the electron ray to start another frame. At the termination of the control impulse the condenser 200 will again become charged, thereby producing another saw tooth wave. The control impulse supplied to conductor 217 may be supplied over this conductor to the modulation amplifier 40 Figure 2 to modulate the carrier wave with the vertical control impulse. The vertical control impulses may be supplied over conductor 218 to the other vertical saw tooth generators 50′ for terminating the saw tooth waves produced in these generators. The impulses produced at load resistor 216 may be applied over conductor 219 to the conductor 115 to trigger the horizontal saw tooth generator with the vertical saw tooth generator.

Since the vertical saw tooth generators in channel equipments 2, 3 and 4 are similar they are preferably adjusted so that each generator will have a slightly different time interval, or the trigger tube may become conductive in sequence, in order that the generator having the shortest interval may be controlling.

Assuming that generator 50′ in channel equipment 2 as having the shortest interval, then control impulses may be supplied over conductors 217′, 218 and 217 to trigger tube 202 and to modulate the carrier wave. The control impulses received from generator 50′ may be supplied to grid 220 in tube 213 to produce a voltage drop at load resistor 221 which is supplied to the grid 214 at substantially the same time that a positive pulse is supplied to the grid 212 as previously explained, to maintain the control electrode 215 at normal potential to block the development of a control impulse at resistor 216 when control signals are received from another generator, or they may be received from the second detector when the vertical saw tooth generator is used in the receiver station.

The control signals produced at load resistor 216 when the generator 50 is controlling may be supplied over conductor 222 to the grid in tube 223 to provide a negative pulse to the grid 224 at the same time that a positive pulse from the load resistor 216 is supplied to the grid 220 from conductor 217, thereby eliminating interference with the control signals produced in the same generator. A limiter stage 225 may be provided to maintain amplitude of control signals at a certain value. It is to be understood that the generator 50 may supply saw tooth potentials to all the channel equipments 2, 3 and 4 when they are suitably located.

It is to be further understood that the horizontal and vertical saw tooth wave generators and the selector mechanism described above in connection with the transmitting station may also be used in the receiving stations shown in Figures 1 and 3. While I have not shown structure for interlace scanning, it is to be understood that the system shown and described in my copending application Serial No. 451,722 and Serial No. 476,897 may be employed to terminate or trigger the first horizontal saw tooth wave in alternate fields at some time less than the total time required for a saw tooth wave.

With further reference to Figure 6 the numeral 240 may indicate a belt arranged to move relatively large sheets of paper attached thereto within the view of the camera tube 36, or the paper may be in a continuous strip with blank spaces between the frames of printed matter. The sprocket pulley 241 may be driven intermittently by the continuously rotating motor 242 through the slip clutch indicated by the dashed circle 243. The vertical control impulses produced at load resistor 216 in Figure 5 may be applied over conductor 244 to the grid of tube 245 thereby energizing slow to release relay 246 each time a vertical control impulse occurs. Relay 246 upon energizing closes a circuit through release magnet 247 to draw the holding bar 248 out of engagement with the pin 249 thus releasing the sprocket pulley 241 to make one complete revolution, thereby moving the belt 240 to bring another sheet of paper within the view of the camera tube 36, during substantially the vertical retrace period of the electron ray. The sprocket pulley 241 will be held in the position shown in Figure 6 while the electron ray is caused to scan the mosaic screen 37.

With further reference to Figure 7 the numeral 250 indicates a photographic film in a camera 251 having a sprocket pulley 252 driven intermittently by the motor 253 through a slip clutch indicated by the dashed circle 254. The vertical control pulse produced at load resistor 216 Figure 5 when this figure is used in the receiving station may be applied over conductor 255 to the grid of tube 256, thereby actuating slow to release relay 257. Relay 257 upon energizing closes a circuit to relay 258. Relay 258 upon energizing actuates the camera shutter 259 and thereafter closes a circuit through release magnet 260 to draw the holding bar 261 out of engagement with pin 262, thus releasing the sprocket pulley 252 for one complete revolution, thereby pulling an unexposed portion of the film into suitable position for recording the picture image on the viewing tube screen 68 during substantially the retrace period of the electron ray. The sprocket pulley 252 will be held in the position shown in Figure 7 during the trace period or while the electron ray is caused to scan the screen 68. The wind up reel 263 may be driven by the motor 253.

The apparatus and associated circuits shown in Figures 6 and 7 are preferably intended for facsimile transmission of newspapers or parts of newspapers in succession or any other subject matters on relatively large sheets of paper. With this equipment the field or frame scanning rate may be considerably lower than the conventional rate, however, the number of lines per field may be the same or higher than the conventional rate.

Referring again to Figure 8 which shows equipment for photographing or recording the picture images from a television screen or cathode ray tube screen with thirty frames per second on a moving picture film having only twenty-four frames per second. This equipment is very similar to that shown in Figure 7 and like components have been given like reference numerals primed so that further explanation of these components is thought to be unnecessary. The difference between Figure 7 and Figure 8 is that the relay 258′ is not energized each time that the relay 257′ is actuated, but the circuit for relay 258′ may be through spring contacts 264 closed by the cams 265 on each two and each three impulses in sequence or on the second, fifth, seventh, tenth, etc. impulses. The cams 265 may be rotated by the release of the stepping magnet 266 which is energized through a circuit closed by the impulse relay 257′. Thus, each impulse rotates the cam one step. As shown in Figure 8 an impulse over conductor 255 actuates relay 257′ momentarily to close a circuit to stepping magnet 266. Magnet 266 upon releasing rotates the cam 267 one step to close springs 264 so that the next impulse in operating relay 257′ closes a circuit through contacts 264 to the relay 258′, thereby actuating the shutter and moving the film as described in connection with Figure 7. The release of magnet 266 rotates the cam 267 to open springs 264.

From the above description it has been shown that any receiving station or channel equipment may receive any one of a number of programs over a single carrier wave and that moving picture film for twenty-four frames per second may be automatically produced from television images having thirty frames per second.

It is to be understood that the several programs or messages received over a single carrier may be photographically recorded.

In the various circuits shown I have simplified the drawings by indicating the source of potential by a sign. Also I have omitted the heater filaments for the various tubes, but it will be understood that such filaments are necessary.

The embodiments of the invention which have been given herein are illustrations of how the various features may be accomplished and the principles involved. It is to be understood that the invention contained herein is capable of embodiment in many other forms and adaptations, without departing from the spirit of the invention and the scope of the appended claims.

Having thus described my invention, I claim:

1. In a communication system, a transmitting station, a plurality of cathode ray tubes at said station, each of the said tubes having an image screen and an electron ray directed toward its screen, means to produce saw tooth timing waves, means to deflect said electron rays in sequence to scan a line at a time on said screens in successive rotation, means whereby said deflecting means are controlled by said saw tooth timing waves, and means including manually operable multi-position members to interchange the scanning periods for at least two of said tubes, according to the positions of said members, to scan lines on said screens in a different sequence.

2. In a communication system, a plurality of cathode ray tubes, each of the said tubes provided with an image screen and an electron ray directed toward its screen, means to produce a series of saw tooth timing waves, means to divide the interval of each saw tooth wave into several periods equal to at least twice the number of said tubes, means to deflect said electron rays in sequence during certain of said periods to scan said screens in rotation to produce picture signals, representative of a different scene within the view of each of the said tubes for transmission during said certain periods, means whereby said deflecting means are controlled by said saw tooth timing waves, means for converting sound related to said different scenes into electrical sound signals, and means associated with each of the said tubes including a gate amplifier under control of said saw tooth waves to select portions of said sound signals for each of said screens in sequence for transmission during the other said periods.

3. In a communication system, means to receive a carrier wave modulated with picture signals for each of a number of different scenes, being televised, in successive rotation, a plurality of cathode ray viewing tubes, each of the said tubes provided with a screen and an electron ray directed toward its screen, means associated with each of the said tubes to produce saw tooth timing waves, means to deflect the said electron rays over their associated screens during a different recurring period of time for each of the said screens to produce on each of the said screens from said signals independent facsimile images for a different one of the said scenes, said last means also including a manually operable multiple-position switch associated with one of said tubes to change the scanning period for said one tube, according to the position of said switch, to produce on the screen for said one tube images similar to those appearing on a second one of said screens, and means whereby said deflecting means are controlled by said saw tooth timing waves.

4. In a facsimile communication system, a receiving station to receive a plurality of groups of picture signals, and synchronizing signals during different recurring periods of time over a common carrier wave, a plurality of cathode ray tubes at said station, each of the said tubes having an image screen and an electron ray directed toward its screen, means at said station to produce saw tooth timing waves under control of said synchronizing signals, a multi-position switch for each of said tubes, means associated with each of the said tubes under control of certain of said saw tooth waves to select different recurring periods of time, a different recurring period for each of the said tubes according to the positions of said switches, for electron ray deflection and to condition said tubes for electron ray modulation, means to deflect the said electron rays over their respective screens during the selected recurring periods to utilize at each of the said tubes a different one of said groups of picture signals to produce on each of the said screens fascimile images for a different message, means whereby said deflecting means are controlled by said saw tooth timing waves, and a camera for each of the said screens, each of the said cameras having a moveable light sensitive film and an operable member under control of certain of said synchronizing signals to progressively record thereon the images appearing on their associated screens.

5. In a communication system, a receiving station to receive a plurality of groups of picture signals and synchronizing signals during different recurring periods of time over a common carrier wave, a cathode ray tube at said station, said tube having an image screen and an electron ray directed toward its screen, means to produce saw tooth timing waves under control of said synchronizing signals, means under control of certain of the said saw tooth waves and a manually operable multi-position member to select any one of a number of predetermined periods of time in the interval of each of the said certain saw tooth waves, according to the position of said member, for electron ray deflection and to condition its associated tube for electron ray modulation, means to deflect said electron ray over its screen during the selected recurring period to utilize one of said groups of picture signals to produce on its screen facsimile images, and means whereby said deflecting means are controlled by said saw tooth timing waves.

6. The facsimile communication system as claimed in claim 5 which includes, in addition, a camera disposed in alignment with said screen having a movable light sensitive film and a movable shutter to expose successive portions of the film to light rays from said screen, means including film moving mechanism cooperable with said synchronizing signals to control the movement of said shutter and said film for making a record of the images appearing on said screen.

7. In a communication system, a plurality of cathode ray camera tubes, each of the said tubes having an image screen and an electron ray directed toward its screen, unrelated subject matter within the view of each of the said tubes, said subject matter for each of the said tubes representative of a separate and independent message, first generator means associated with said tubes to produce first sawtooth timing waves, a first multi-position member associated with each of the said tubes, first means to deflect said electron rays to scan a line at a time on said image screens, in any desired sequence according to the position of said members, to produce picture signals representative of said subject matters, means whereby said deflecting means are controlled by said saw tooth timing waves, means to produce a carrier wave, means to modulate said carrier wave with said picture signals for the separate messages during different recurring periods of time, means to receive said picture signals, a plurality of cathode ray viewing tubes, each of the said viewing tubes having an image viewing screen and an electron beam directed toward its viewing screen, second generator means associated with said viewing tubes to produce other sawtooth timing waves in synchronism with said first saw tooth waves, a second multi-position member associated with each of the said viewing tubes, second means to deflect said electron beams to scan a line at a time on said viewing screens, in any desired sequence according to the positions of said second members, to produce on each of the said viewing screens facsimile images for a separate independent message from said received picture signals, and means whereby said second deflecting means are controlled by said other saw tooth timing waves.

8. In a communication system, a plurality of cathode ray camera tubes, each of the said tubes having an image screen and an electron ray directed toward its screen, unrelated subject matter within the view of each of the said tubes, said subject matter for each of the said tubes representative of a separate and independent message, generator means associated with said tubes to produce sawtooth timing waves, a multi-position member associated with each of the said tubes, means to deflect said electron rays to scan a line at a time on said image screens, in any desired sequence according to the positions of said members, to produce picture signals representative of said subject matters, means whereby said deflecting means are controlled by said saw tooth timing waves, means to produce a carrier wave, and means to modulate said carrier wave with the said picture signals for the separate messages during different recurring periods of time.

9. In a communication system, means to receive picture signals representative of a plurality of separate independent messages in successive rotation, a plurality of cathode ray viewing tubes, each of said viewing tubes having an image viewing screen and an electron beam directed toward its viewing screen, generator means associated with said viewing tubes to produce sawtooth timing waves, a multi-position member associated with each of the said viewing tubes, means to deflect said electron beams to scan a line at a time on said viewing screens, in any desired sequence according to the position of said members, to produce on each of the said viewing screens facsimile images for a separate independent message from said received picture signals, and means whereby said deflecting means are controlled by said saw tooth timing waves.

10. In a communication system, a transmitting station, a plurality of cathode ray camera tubes at said station, each of the said tubes having an image screen and an electron gun to produce an electron ray directed toward its screen, means associated with said station to produce sawtooth waves and synchronizing signals to control termination of the sawtooth timing waves, mechanical means associated with each of the said tubes under control of certain of said synchronizing signals to move subject matter within the view of their respective tubes to produce images on each of the said screens for a different message, a first multi-position member associated with each of the said tubes, means to deflect said electron rays under control of said timing waves to cause the said electron rays to scan a line at a time on said image screens, in any desired sequence according to the positions of said members, to produce picture signals representative of said subject matters, means to produce a carrier wave, means to modulate said carrier wave with the said picture signals for the separate messages and said synchronizing signals, a receiving station to receive said signals, a plurality of cathode ray viewing tubes at said receiving station, each of the said viewing tubes having an image viewing screen and an electron gun to produce an electron beam directed toward its viewing screen, means associated with said receiving station under control of said received synchronizing signals to produce other sawtooth timing waves, a second multi-position member associated with each of the said viewing tubes, means to deflect said electron beams under control of said other timing waves to cause said electron beams to scan a line at a time on said viewing screens, in any desired sequence according to the positions of said second members, to produce on each of the said viewing screens facsimile images for a separate independent message from said received picture signals, and photographic means for each of the said viewing screens under control of certain of said received synchronizing signals to record the facsimile images appearing on said viewing screens.

11. In a communication system, a transmitting station, a plurality of cathode ray tubes at said station, each of the said tubes having an image screen and an electron gun to produce an electron ray directed toward its screen, means associated with said station to produce sawtooth timing waves and synchronizing signals to control termination of the sawtooth waves, mechanical means associated with each of the said tubes under control of certain of said synchronizing signals to move subject matter within the view of their respective tubes to produce images on each of the said screens for a different message, a multi-position member associated with each of the said tubes, means to deflect said electron rays under control of said timing waves to cause said electron rays to scan a line at a time on said image screens, in any desired sequence according to the positions of said members, to produce picture signals representative of said subject matters, means to produce a carrier wave, and means to modulate said carrier wave with said picture signals for the separate messages and said synchronizing signals.

12. In a communication system, a receiving station to receive picture signals for a number of separate messages and synchronizing signals, a plurality of cathode ray viewing tubes at said receiving station, each of the said viewing tubes having an image viewing screen and an electron gun to produce an electron beam directed toward its viewing screen, means associated with said receiving station under control of said received synchronizing signals to produce sawtooth timing waves, a multi-position member associated with each of the said viewing tubes, means to deflect the said electron beams under control of said timing waves to cause said electron beams to scan a line at a time on said viewing screens, in any desired sequence according to the positions of said members, to produce on each of the said viewing screens facsimile images for a separate independent message from said received picture signals, and photographic means for each of the said viewing screens under control of certain of said received synchronizing signals to record the facsimile images appearing on said viewing screens.

13. In a radio communication system, a transmitting station, means associated with said station to produce a carrier wave, a plurality of transmitter channel equipments associated with said station, each of the said channel equipments comprising operable means to produce electrical signals representative of a different message, generator means associated with said station to produce timing waves and synchronizing signals to control the duration of the timing waves, first selecting means forming a part of each of the said channel equipments, each of the said selecting means comprising a first manually adjustable member, means controlled by said timing waves to select different recurrent periods of time, according as said members are adjusted to different positions, to control modulation of said carrier wave with electrical signals for each of the said messages in a different selected recurrent period, means to transmit said carrier wave modulated with electrical signals for each of the said messages and said synchronizing signals, a receiving station to receive said signals, generator means associated with said receiving station under control of said received synchronizing signals to produce other timing waves, a plurality of receiver channel equipments associated with said receiver station, each of the said receiver channel equipments comprising a message reproducing device, second selecting means forming a part of each of the said receiver channel equipments, each of the said second selecting means comprises a second manually adjustable multi-position member, means controlled by said other timing waves to select said recurrent periods, according as said second members are adjusted to different positions, to supply received electrical signals for a different desired message to each of the said reproducing devices for reproduction of the desired messages.

14. In a radio communication system, a transmitting station, means associated with said station to produce a carrier wave, a plurality of transmitter channel equipments associated with said station, each of the said channel equipments comprising operable means to produce electrical signals representative of a different message, generator means associated with said station to produce timing waves and synchronizing signals to control the duration of the timing waves, selecting means forming a part of each of the said channel equipments, each of the said selecting means comprising a manually adjustable multi-position member, means controlled by said timing waves to select different recurrent periods of time, according as said members are adjusted to different positions, to control modulation of said carrier wave with electrical signals for each of the said messages in a different selected recurrent period, means to transmit said carrier wave modulated with electrical signals for each of the said messages and said synchronizing signals.

15. In a radio communication system, a receiving station to receive electrical signals representative of a number of different messages and synchronizing signals, said electrical signals for each message being received in a different recurrent period of time, generator means associated with said receiving station under control of said received synchronizing signals to produce timing waves, a plurality of receiver channel equipments associated with said receiver station, each of the said receiver channel equipments comprising a message reproducing device, selecting means forming a part of each of the said receiver channel equipments, each of the said selecting means comprising a manually adjustable multi-position member, means controlled by said timing waves to select said recurrent periods, according as said members are adjusted to different positions, to supply received electrical signals for a desired message to each of the said reproducing devices for reproduction of the desired messages.

16. In a communication system, a transmitting station, means associated with said station to produce a carrier wave, a plurality of transmitter channel equipments associated with said station, each of the said channel equipments comprising a cathode ray tube to produce picture signals representative of subject matter or a scene and a microphone to produce message signals representative of an audible message to accompany said picture signals, generator means associated with said station to produce sawtooth timing waves and synchronizing signals to control the duration of the sawtooth timing waves, first selecting means forming a part of each of the said channel equipments, each of the said selecting means comprising a manually adjustable multi-position member, means controlled by said timing waves to select different pairs of recurrent periods of time, according as said members are adjusted to different positions, to control modulation of said carrier wave with said picture signals and said message signals, picture signal modulation for each different subject matter or scene occurring during a first recurrent period in each pair and the accompanying message signal modulation occurring during the second recurrent period in each pair, means to transmit said carrier wave modulated with said picture signals, message signals and synchronizing signals, a receiving station to receive said signals, generator means associated with said receiving station under control of said received synchronizing signals to produce other sawtooth timing waves, a plurality of receiver channel equipments associated with said receiver station, each of the said receiver channel equipments comprising a cathode ray viewing tube and a signal device, second selecting means forming a part of each of the said receiver channel equipments, each of the said second selecting means comprising a manually adjustable multi-position member, means controlled by said other saw tooth timing waves to select said pairs of recurrent periods, according as said second members are adjusted to different positions, to supply received picture signals for a desired subject matter or scene to each of the said cathode ray viewing tubes for image reproduction of the desired subject matter or scene and to supply said received message signals to said signal devices for audible reproduction of the message to accompany the images appearing on each of the said viewing tubes.

17. In a communication system, a transmitting station, means associated with said station to produce a carrier wave, a plurality of transmitter channel equipments associated with said station, each of the said channel equipments comprising a cathode ray tube to produce picture signals representative of subject matter or a scene and a microphone to produce message signals representative of an audible message to accompany said picture signals, generator means associated with said station to produce sawtooth timing waves and synchronizing signals to control the duration of the sawtooth timing waves, selecting means forming a part of each of the said channel equipments, each of the said selecting means comprising a manually adjustable multi-position member, means controlled by said saw tooth timing waves to select different pairs of recurrent periods of time, according as said members are adjusted to different positions, to control modulation of said carrier wave with said picture signals and said message signals, picture signal modulation for each different subject matter or scene occurring during a first recurrent period in each pair and the accompanying message signal modulation occurring during the second recurrent period in each pair, and means to transmit said carrier wave modulated with said picture signals, message signals and synchronizing signals.

18. In a communication system, a receiving station to receive picture signals for a number of different subject matters or scenes and message signals to accompany each different subject matter or scene, said picture signals for each subject matter or scene with the accompanying message signals being received in a different pair of recurrent periods of time, generator means associated with said receiving station under control of said received synchronizing signals to produce sawtooth timing waves, a plurality of receiver channel equipments associated with said receiver station, each of the said receiver channel equipments comprising a cathode ray viewing tube and a signal device, selecting means forming a part of each of the said receiver channel equipments, each of the said selecting means comprising a manually adjustable multi-position member, means controlled by said sawtooth timing waves to select said pairs of recurrent periods, according as said members are adjusted to different positions, to supply received picture signals for a desired subject matter or scene to each of the said cathode ray viewing tubes for image reproduction of the desired subject matter or scene and to supply said received message signals to the said signal devices for audible reproduction of the messages to accompany the images appearing on each of the said viewing tubes.

19. In a communication system, a receiving station to receive picture signals representative of a number of different facsimile messages or scenes being televised and synchronizing signals, said picture signals for each message or scene being received in a different recurrent period of time, a cathode ray tube associated with said station having an image screen and an electron gun to produce an electron ray directed toward the screen, generator means associated with said tube under control of said received synchronizing signals to produce sawtooth timing waves, a manually adjustable multi-position member, means controlled by said timing waves to select any one of said recurrent periods, according to the position of said member, for supplying received picture signals for a desired facsimile message or scene to said cathode ray tube, and means controlled by said saw tooth timing waves to cause the electron ray to scan said screen to produce thereon images for the desired message or scene.

20. In a communication system, a plurality of cathode ray tubes, each of the said tubes having an image screen and an electron ray directed toward its screen, unrelated subject matter within the view of each of the said tubes, said subject matter for each of the said tubes representative of a separate and independent message, generator means associated with said tubes to produce sawtooth timing waves, a manually adjustable multi-position member associated with each of the said tubes, means controlled by said timing waves to cause the said electron rays to scan said screens to produce picture signals representative of said subject matters, means to produce a carrier wave, and means including said multi-position members to modulate said carrier wave with the said picture signals for the separate messages in successive rotation and in any desired sequence according to the positions of said members.

21. In a communication system, a transmitting station to transmit picture signals representative of a scene and sound signals representative of a message to accompany the picture signals, a cathode ray tube associated with said station having an image screen and an electron ray directed toward the screen, generator means associated with said tube to produce saw tooth waves, a multi-position switch associated with said station, means including circuits associated with said switch under control of said saw tooth waves to select any pair of a number of pairs of recurrent periods of time, according to the position of said switch, means to cause the electron ray to scan said screen during a first one of the selected recurrent periods to produce said picture signals, means associated with said transmitter to produce said sound signals, and means including an amplifier cooperable with said saw tooth waves to transmit said picture signals during said first selected recurrent period and fragmentary portions of said sound signals during a second one of the selected recurrent periods.

22. In a communication system, a receiving station to receive picture signals representative of a number of different scenes during different recurrent periods of time and sound signals representative of a different message for each scene during other recurrent periods, a cathode ray tube associated with said station having an image screen and an electron ray directed toward the screen, generator means associated with said tube to produce saw tooth waves, a message signal reproducing device, a multi-position switch associated with said station, means including circuits associated with said switch under control of said saw tooth waves to select any pair of a number of pairs of said recurrent periods, according to the position of said switch, means to cause the electron ray to scan said screen during a first one of the selected recurrent periods to produce images on said screen from the signals received during said first selected recurrent period and to reproduce a message on said device to accompany the images from signals received during a second one of the selected recurrent periods.

23. In a communication system, a transmitter to transmit signals representative of subject matter during any one of a number of successive recurrent periods of time, a signal producing device associated with said transmitter, means associated with said device to produce timing waves, a multi-position switch associated with said transmitter, means including circuits associated with said switch under control of said timing waves to select any one of the said recurrent periods, according to the position of said switch, means to cause said device to produce picture signals only during the selected recurrent period representative of said subject matter for transmission during the selected recurrent period.

24. In a communication system, a transmitter to transmit signals representative of a scene during any one of a number of successive recurrent periods of time, a cathode ray tube associated with said transmitter having an image screen and an electron ray directed toward the screen, generator means associated with said tube to produce saw tooth waves, a multi-position switch associated with said tube, means including circuits associated with said switch under control of said saw tooth waves to select any one of the said recurrent periods exclusive of the other said recurrent periods, according to the position of said switch, means to cause the electron ray to scan said screen during the selected recurrent period to produce picture signals representative of said scene for transmission during the selected recurrent period.

25. In a communication system, a receiver to receive different trains of picture signals in different recurrent periods of time, each of the said trains of signals representative of different subject matter being transmitted, a cathode ray tube associated with said receiver having an image screen and an electron ray directed toward the screen, means associated with said tube to produce a series of line saw tooth waves and a series of frame saw tooth waves, a multi-position switch associated with said receiver, means including circuits associated with said switch under control of said line saw tooth waves to select any one of the said recurrent periods, according to the position of said switch, means to apply a train of said signals to said tube exclusive of the other said trains of signals and means under control of said saw tooth waves to cause the electron ray to scan said screen for image reproduction of the desired subject matter.

26. In a communication system, a receiver to receive different trains of picture signals in different recurrent periods of time, each of the said trains of signals representative of different subject matter being transmitted, a signal reproducing device associated with said receiver, means associated with said device to produce timing waves, a multi-position switch associated with said receiver, means including circuits associated with said switch under control of said timing waves to select any one of the said recurrent periods, according to the position of said switch, means to apply a train of said signals to said device exclusive of the other said trains of signals for reproduction of the desired subject matter.

27. In a communication system, a transmitter to transmit signals representative of subject matter during any one of a number of successive recurrent periods of time, a cathode ray pick up tube associated with said transmitter having an image screen and an electron ray directed toward the screen, means associated with said tube to produce saw tooth waves and synchronizing signals to control the saw tooth waves, means including a movable member cooperable with said synchronizing signals to display successive sheets of subject matter within the view of said tube to produce representative images on said screen, a multi-position switch for said transmitter, means including circuits associated with said switch under control of said saw tooth waves to select any one of the said recurrent periods, according to the position of said switch, means to cause the electron ray to scan said screen to produce picture signals representative of said subject matter during the selected recurrent period for transmission during the selected recurrent period.

28. In a communication system, a receiver to receive different trains of picture signals in different recurrent periods of time and synchronizing signals, each of the said trains of signals representative of different subject matter being transmitted, a cathode ray tube associated with said receiver having an image screen and an electron ray directed toward the screen, means associated with said tube under control of said synchronizing signals to produce saw tooth waves, a multi-position switch for said receiver, means including circuits associated with said switch under control of said saw tooth waves to select any one of the said recurrent periods, according to the position of said switch, means to apply a train of said signals to said tube exclusive of the other said trains of signals, means under control of said saw tooth waves to cause the electron ray to scan said screen for image reproduction of the desired subject matter, a photographic recorder focused upon said screen, comprising a film sensitive to light rays from said screen, and film moving mechanism cooperable with said synchronizing signals to control the movement of said film for making a record of the images appearing on said viewing screen.

29. A communication system as claimed in claim 19, and in addition there is provided a photographic recorder focused on said image screen having a movable film sensitive to the light rays from said screen, and film moving mechanism cooperable with said synchronizing signals to control the movement of said film for making a record of the images appearing on said screen.

JOHN H. HOMRIGHOUS.

REFERENCES CITED

The following references are of record in the file of this patent:

UNITED STATES PATENTS

| Number | Name | Date |
|---|---|---|
| 1,873,785 | Ranger | Aug. 23, 1932 |
| 1,873,786 | Ranger | Aug. 23, 1932 |
| 1,925,814 | Nicolson | Sept. 5, 1933 |
| 1,956,397 | Nicholson | Apr. 24, 1934 |
| 1,978,684 | McCreary | Oct. 30, 1934 |
| 1,990,544 | Gray | Feb. 12, 1935 |
| 2,056,247 | Briggs | Oct. 6, 1936 |
| 2,107,464 | Zworykin | Feb. 8, 1938 |
| 2,142,339 | Weaver | Jan. 3, 1939 |
| 2,146,876 | Zworykin | Feb. 14, 1939 |
| 2,174,490 | Somers | Sept. 26, 1939 |
| 2,181,564 | Goldsmith | Nov. 28, 1939 |
| 2,191,565 | Henroteau | Feb. 27, 1940 |
| 2,195,676 | McCarthy | Apr. 2, 1940 |
| 2,207,716 | Burnstead | July 16, 1940 |
| 2,213,178 | Iams | Aug. 27, 1940 |
| 2,219,149 | Goldsmith | Oct. 22, 1940 |
| 2,244,688 | Goldsmith | June 10, 1941 |
| 2,251,786 | Epstein | Aug. 5, 1941 |
| 2,259,884 | Goldsmith | Oct. 21, 1941 |
| 2,266,194 | Guanella | Dec. 16, 1941 |
| 2,275,898 | Goldsmith | Mar. 10, 1942 |
| 2,282,046 | Goldsmith | May 5, 1942 |
| 2,293,899 | Hanson | Aug. 25, 1942 |
| 2,295,023 | Beatty | Sept. 8, 1942 |
| 2,299,471 | DuMont | Oct. 20, 1942 |
| 2,300,568 | Hansell | Nov. 3, 1942 |
| 2,301,199 | Bruce | Nov. 10, 1942 |
| 2,309,393 | Homrighous | Jan. 26, 1943 |
| 2,314,920 | Bumstead | Mar. 30, 1943 |
| 2,326,515 | Bartelink | Aug. 10, 1943 |
| 2,351,889 | Strubig | June 20, 1944 |
| 2,354,199 | Collins | July 25, 1944 |
| 2,364,357 | Halstead | Dec. 5, 1944 |
| 2,369,783 | Homrighous | Feb. 20, 1945 |
| 2,381,902 | Goldsmith | Aug. 14, 1945 |
| 2,394,435 | Finch | Feb. 5, 1946 |
| 2,398,641 | Homrighous | Apr. 16, 1946 |
| 2,401,384 | Young | June 4, 1946 |
| 2,403,210 | Butement | July 2, 1946 |
| 2,404,839 | Hammond | July 30, 1946 |
| 2,405,252 | Goldsmith | Aug 6, 1946 |
| 2,408,108 | Teal | Sept. 24, 1946 |
| 2,420,029 | Brady | May 6, 1947 |
| 2,423,770 | Goldsmith | July 8, 1947 |
| 2,431,115 | Goldsmith | Nov. 18, 1947 |
| 2,434,697 | Homrighous | Jan. 20, 1948 |
| 2,434,698 | Homrighous | Jan. 20, 1948 |
| 2,436,516 | Larson | Feb. 24, 1948 |
| 2,437,027 | Homrighous | Mar. 2, 1948 |
| 2,437,300 | Labin | Mar. 9, 1948 |
| 2,458,368 | Kamin | Jan. 4, 1949 |
| 2,468,256 | Espley | Apr. 26, 1949 |
| 2,477,625 | Labin | Aug. 2, 1949 |

FOREIGN PATENTS

| Number | Country | Date |
|---|---|---|
| 109,263 | Australia | Nov. 30, 1939 |
| 373,776 | Great Britain | Mar. 24, 1937 |
| 388,370 | Great Britain | May 13, 1946 |